Dec. 24, 1968  A. R. FJERMESTAD ETAL  3,417,763
MILK LINE WASHING SYSTEM
Filed Dec. 27, 1966  2 Sheets-Sheet 2

INVENTORS
ARNOLD R. FJERMESTAD,
BY LAVERNE C. CHRISTENSEN
Schroeder, Siegfried
& Ryan   ATTORNEYS

United States Patent Office 3,417,763
Patented Dec. 24, 1968

3,417,763
MILK LINE WASHING SYSTEM
Arnold R. Fjermestad and La Verne C. Christensen, Albert Lea, Minn., assignors to Universal Milking Machine Division, National Cooperatives, Inc., Albert Lea, Minn., a corporation of Minnesota
Filed Dec. 27, 1966, Ser. No. 604,729
8 Claims. (Cl. 134—58)

ABSTRACT OF THE DISCLOSURE

Apparatus for washing out a milk line in a continuous operation which is automatic, once it is commenced, and which uses a vacuum-controlled flow-directing valve connected to the discharge of the pump normally utilized to evacuate the receiver of the system and is controlled by and coordinated with a programmed water supply system so as to automatically direct the wash water back into its supply for recirculation and to direct the rinse water to a drain to avoid its recirculation.

---

Figure 1:
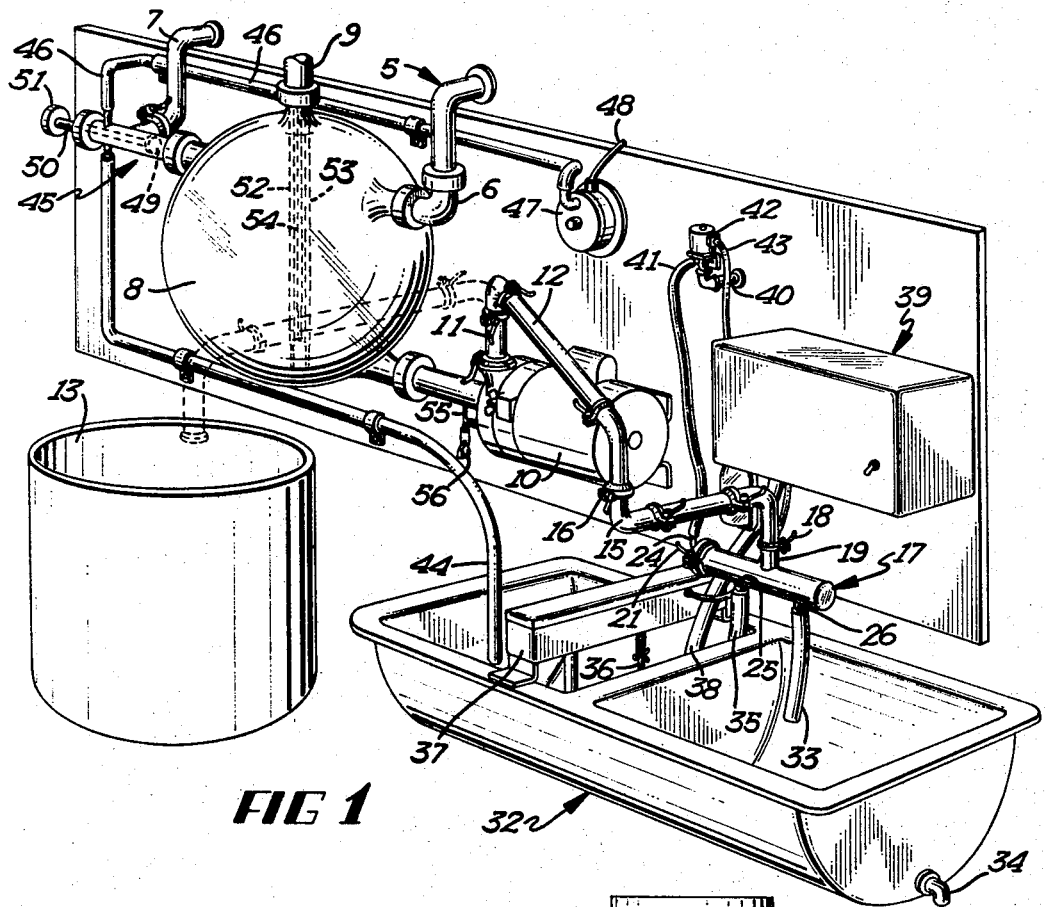

It is a general object of our invention to provide a novel and improved milk line washing system which avoids the unsanitary practice of recirculation of the rinse water through the line.

A more specific object is to provide a novel and improved milk line washing system which automatically provides for the discharge of the rinse water into a drain after it is passed only once through the milk line.

A still more specific object is to provide a novel and improved milk line washing system which automatically provides, through the use of a vacuum-controlled valve, for recirculation of the wash water through the system and for the discharge of the rinse water without recirculation through the system in order to avoid recontamination of the line by foreign material picked up by the rinse water as it passes through the line.

Figure 2:
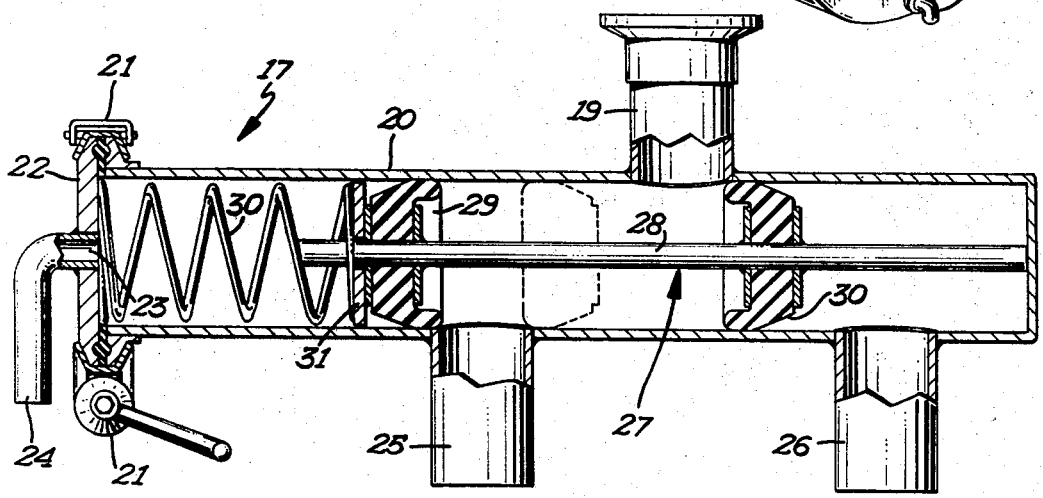
Figure 3:
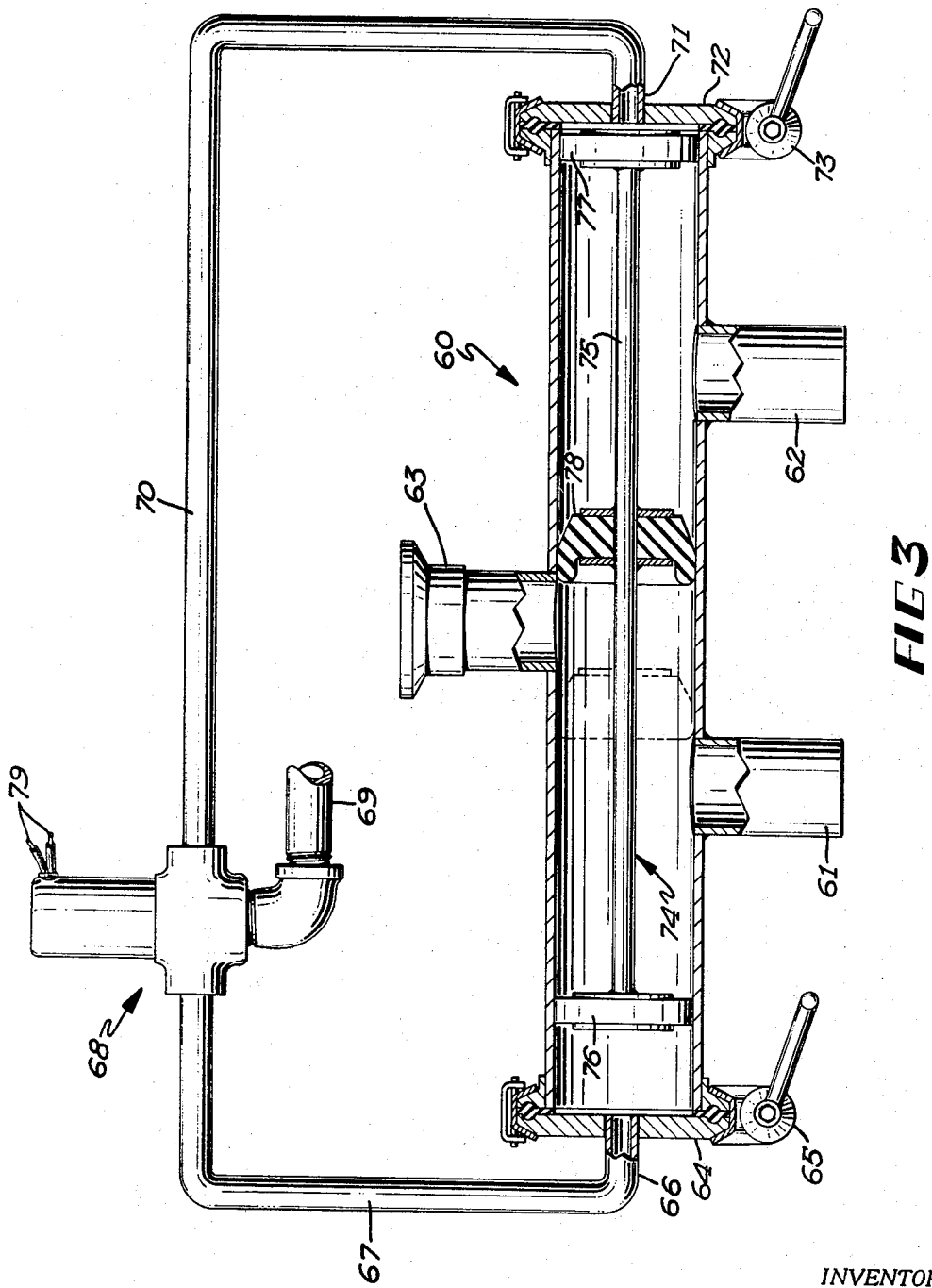

These and other objects and advantages of this invention will more fully appear from the following description, made in connection with the accompanying drawings, wherein like reference characters refer to the same or similar parts throughout the several views, and in which:

FIG. 1 is a perspective view of one embodiment of our milk line washing system;

FIG. 2 is a partial side elevational and partial vertical sectional view of the vacuum-controlled flow-directing valve utilized to obtain the objects of the invention; and FIG. 3 is a partial side elevation and a partial vertical sectional view of a second form of the valve which utilizes only suction for its control, the valve being shown connected at each of its ends to a vacuum-controlling valve.

In the embodiment shown, the milk line which is indicated generally by the numeral 5 has a first portion 6 and a second portion 7, each of which communicates with the interior of the hollow receiver 8. The vacuum line 9 which leads to a source of vacuum (not shown) maintains the interior of the hollow receiver 8 under a partial vacuum and serves to draw the milk through the milk line 5 into the interior of the receiver 8 and thereby collect the same at a central location. From the receiver 8 the milk is pumped by an evacuating pump 10 through its discharge 11 and swingable discharge pipe 12 into a bulk storage tank 13. This arrangement has become conventional in milk machine systems within this country and is well-known and practiced throughout the art.

It has also become conventional, by one method or another, to pump first wash water (water with detergent added) and then rinse water through the milk line 5. This is accomplished by recirculation of the wash water (which is desirable in order to conserve the detergent and hot water and thereby avoid undue expense) followed by rinse water which is likewise circulated. However, recirculation of the rinse water tends to merely recirculate any impurities or foreign materials which may have been picked up and consequently, the most efficient and desirable results are not obtained. Moreover, the various health authorities are becoming increasingly critical of such systems because of the recontamination caused by recirculating the rinse water.

To eliminate these adverse features, we have conceived of a washing system which utilizes the milk collecting apparatus as part thereof in combination with a vacuum-controlled flow-directing valve which we have designed to automatically provide the desired recirculation of the wash water and eliminate the undesirable recirculation of the rinse water. We utilize this valve in conjunction with a timed control system to effect a continuous automatic washing operation once it is commenced.

To effect the washing and rinsing operation in the preferred manner, we provide an extension 15 for the swingable discharge pipe 12. This extension is attached to pipe 12 by means of a clamp 16 and at its other end it is connected to our vacuum-controlled flow-directing valve indicated generally as 17 by means of a clamp 18 which engages the inlet 19 of that valve.

The valve 17 is comprised of an essentially closed tubular member 20 which is closed at one end and its other end is connected by a clamp 21 to an end plate 22 having suction port 23 and nipple 24. The member 20 has a pair of axially spaced discharge tubes 25 and 26 disposed at opposite sides of the inlet 19 and communicating therewith.

Mounted within the tubular member 17 and shiftable longitudinally therewithin between opposite extreme positions is a piston member 27. This piston 27 is comprised of a piston rod 28 and a plurality of valve or piston elements 29 and 30 mounted thereon for movement therewith longitudinally of the tubular member 20. A compression spring 30 bears against the inner surface of the end plate 22 and at its opposite end against a pressure plate 31 carried by the rod 28 at the back of the valve 29. Thus the spirng 30, when not compressed, maintains the piston 27 in one of its extreme positions as shown in FIG. 2 and is compressed when the piston is drawn to its opposite extreme position, as shown in broken lines, as a result of suction applied at the port 23.

Disposed below the valve 17 is a two-sectioned tank 32. A hose 33 is connected to the discharge tube 26 and extends into one section of the tank which has a drain 34. A hose 35 is connected to the other discharge tube 25 and extends into the other section of that tank which also has a drain (not shown) that can be opened and closed by a vertically shiftable rod 36 which carries a suitable closure member at its lower end and which is actuated vertically by a solenoid (not shown) at its upper end within the box-like housing 37.

The supply of wash water is provided through the hose 38 which extends into the tank 32, as shown, from the timed control system 39. This control system 39 is currently available on the market, is known as the Klean-O-Matic 6037-4, and can be purchased from the Milking Machine Division of National Cooperatives, Inc., Albert Lea, Minn. This control system is connected to supplies of hot water and detergent and controls the introduction of each into the tank as desired.

A pipe 40 is connected to a source of vacuum (not shown) and to the nipple 24 by a conduit 41. Interposed therewithin is a solenoid 42 which is electrically controlled by the control system 39 through an electric cord 43 so as to open and subject the piston 27 to suction during the rinse cycle only during the washing operation.

A conduit 44 is connected, as shown, to a T-shaped valve 45 which serves to connect the milk line 7 to the receiver 8, and terminates in the tank 32. Also connected to the valve 45 is a conduit 46 which leads to an air control 47, which is controlled by the control system 39 through the electric cord 48. The valve 45 includes a valve element 49 mounted on a rod 50 and movable manually by means of the handle 51 from a position between the conduit 44 and the pipe line 7 to a position between the latter and the receiver 8 to bring the line 7 in fluid communication with the conduit 44.

The operation of the pump 10 is controlled through a plurality of electric probes 52, 53 and 54 which are connected in the electric circuit to the pump 10 and close the circuit when water or milk reaches a level so as to be in contact with each. A pump and line drain 55 is provided with a flapper valve 56 which is held in closed position by the vacuum and opens in response to the weight of the liquid which may remain in the pump or line when the level of liquid within the receiver 8 is such as to fail to make contact with each of the probes 52, 53 and 54.

A second form of the vacuum-controlled flow-directing valve is shown in FIG. 3. This form is designed so as to utilize only the vacuum to move the piston. As shown, it includes a tubular member 60 having a pair of axially spaced discharge tubes 61 and 62 and an inlet tube 63 disposed therebetween. One end of the member 60 is closed by an end plate 64 which is secured by a clamp 65. A nipple 66 extends outwardly from the end plate 64 and is connected by a conduit 67 to a solenoid valve 68 which in turn is connected to a source of vacuum 69. The valve 68 is of the type which connects the source of vacuum 69 at all times to either the conduit 67 or the conduit 70 which leads to the nipple 71 of the end plate 72 that closes the other end of the tubular member 60. A clamp 73 holds the end plate 72 in place as shown.

A piston member 74 is mounted within the tubular member 60 and is comprised of a rod 75 having a piston or valve element 76 at one end and a similar element 77 at its opposite end. A valve 78 is mounted on the intermediate portions of the rod 75 and is movable with the rod between opposite extreme positions in one of which, as shown, it is disposed between the inlet 63 and the outlet tube 62. In its opposite extreme position, as shown in broken lines, the valve element is moved to a position between the inlet 63 and the discharge tube 61. It will be readily understood that the movement of the piston 74 longitudinally of the tubular member 60 from one of such positions to the other is readily controlled by applying vacuum to the appropriate end through the proper conduit 67 or 70 and this is accomplished by actuation of the solenoid 68 through electrical contacts 79 that are connected to and controlled by the Klean-O-Matic 6037–4 control 39.

To utilize our system, the discharge pipe 12 leading from the pump 10 is swung from the milking position (shown in broken lines) to the solid line position shown in FIG. 1 and it is coupled through the use of the clamp 16 to the conduit 15 which in turn is connected to the valve member 17. The Klean-O-Matic 6037–4 control 39 is then actuated manually and it causes the pre-rinse water to be introduced into the section of the tank 32 shown at the left in FIG. 1. While this is taking place, the handle member 51 is moved inwardly to cause the valve element 49 to be disposed between the milk line 7 and the receiver 8. As soon as an adequate supply of rinse water has been introduced into the tank 32, the controls 39 cause the vacuum pump (not shown) to be started and to subject the milk line 5 to vacuum. The application of vacuum to the milk line will cause the rinse water to be drawn upwardly through the conduit 44, through the milk line portions 7 and 6 to pre-rinse the same and back into the receiver 8. It will be understood that the required vacuum is applied through the tube 9 which is connected to the source of vacuum. As soon as sufficient water collects in the receiver 8 to contact each of the probes 52, 53, and 54, the motor which is connected to the pump 10 is actuated thereby and commences to withdraw the pre-rinse water and discharge the same into the valve member 17 which will be in the position shown in FIG. 2 by the broken lines. Thus the rinse water will be returned to the right-hand side of the tank 32. After a given predetermined period of time, the control 39 will actuate the solenoid controlling the rod 36 to open the drain and permit the pre-rinse water to drain therefrom. As the supply is diminished, so that no further pre-rinse water is supplied to the milk line, the level of the pre-rinse water in the receiver 8 will be sufficiently low that the pump 10 will stop. By this time sufficient time will have elapsed so that the control 39 will cause the drain in the tank 32 to be again closed and the control 39 will cause hot water and detergent to be introduced into the same section of the tank 32. During this period, the operations of the vacuum pump will be terminated by the control 39.

When sufficient wash water has been introduced into the tank 32, sufficient time will have elapsed so that the control 39 will again have caused the vacuum pump to be started. This in turn will cause the wash water to be drawn through the milk line in the same manner as that described for the pre-rinse operation and the piston 27 of the valve member 17 will be in the position shown in FIG. 2 so that the wash water will be recirculated. During this operation, the control 39 causes air to be introduced into the line through the conduit 46 from the air control 47 for agitation purposes within the line. In other words, intermittent air is introduced into the line to induce agitation and increase the effectiveness of the washing operation.

After the wash water has been circulated for the desired period, the control 39 will again cause the drain of the tank 32 to be opened by moving the rod 36 vertically and the vacuum pump will be stopped. When the level of the wash water in the receiver 8 reaches such a low level that contact is no longer made between the probes 52, 53, and 54, the pump 10 will stop and the balance of the liquid contained in the receiver 8 and the pump 10 will drain through the water drain 55 because the flapper valve 56 will open as soon as suction is no longer applied thereto. After sufficient time has elapsed to permit all of the wash water to have drained from the tank 32, the control system 39 again closes the drain in the tank by vertical movement of the rod 36. Rinse water is then caused to be introduced into the tank 32 by the control 39 and the vacuum pump (not shown) is again started by these controls. The rinse water is drawn through the line in the same manner as described hereinbefore with respect to the pre-rinse water, the pump 10 starting when the level of the rinse water in the receiver 8 is sufficiently high to close the circuit between the probes 52, 53 and 54. At the same time as the vacuum pump is started, the control 39 activates the solenoid valve 42 so as to connect the suction through the tube 41 to the end of the tubular member 17 and cause the piston 27 and the element 30 to shift to the broken line position shown in FIG. 2, thereby directing the discharge of the rinse water outwardly through the tube 33 and the drain 34. In this manner, the recirculation of the rinse water is prevented and recontamination of the interior of the milk line by foreign materials that may be picked up by the earlier portions of the rinse water will not be permitted to recontaminate the interior of the line.

From the above, it will be readily seen that we have provided an automatic system which will wash a milk line and automatically avoid the unsanitary practice of re circulation of the rinse water. At the same time, the system provides for the automatic recirculation of the wash water which is desirable in order to avoid undue expense but it prevents recontamination of the interior of the line through recirculation of the rinse water.

It will be readily understood that in lieu of the valve member 17 and solenoid 42, the valve 60 and the solenoid valve 68 may be utilized. Thus the control system 39 is arranged so as to cause the solenoid valve 68 to be in such a position as to cause the piston 74 to be in broken line position shown in FIG. 3 during the rinse periods of operation and it will cause the piston to shift to the right-hand end of the tubular member 69 as used in FIG. 3 during the wash cycle. Thus element 78 will be in the solid line position during the wash cycle. The rinse water will be directed outwardly through the tubular member 62 to the drain in order to prevent recirculation of the rinse water.

It will, of course, be understood that various changes may be made in the form, details, arrangement and proportions of the parts without departing from the scope of the invention which consists of the matter shown and described herein and set forth in the appended claims.

What is claimed is:

1. A washing system for a milk line under vacuum having a milk receiver with an evacuating pump connected to the lower portions thereof and having a discharge normally discharging into a bulk milk tank, said system including:
   (a) a receptacle having a drain;
   (b) conduit means connecting the interior of said receptacle with the milk line in fluid-communicating relation as desired;
   (c) a source of wash water connected with said receptacle;
   (d) a source of rinse water connected with said receptacle;
   (e) timed control means controllably connected to said drain and to said sources of wash water and rinse water and constructed and arranged to sequentially introduce wash water into said receptacle and maintaining its drain closed during the wash cycle, and cause the drain of said receptacle to open at the end of the wash cycle until the receptacle is drained, and then close the drain and introduce rinse water from its source into said receptacle;
   (f) a vacuum-controlled flow-directing valve connected to the discharge of the pump and constructed and arranged to alternately direct the discharge thereof either back into the receptacle or to a drain;
   (g) conduit means connecting said flow-directing valve in controlled relation with a source of vacuum; and
   (h) a solenoid valve interposed within said conduit means and connected in controlled relation with said control means and constructed and arranged to cause said flow-directing means to be actuated by the vacuum to direct the wash water discharged by said pump back into said receptacle and to direct the rinse water into the drain.

2. The structure defined in claim 1 wherein said vacuum-controlled flow-directing valve is comprised of an essentially closed tubular member having a pair of discharge outlets which are spaced axially and having a fluid inlet disposed therebetween in fluid communicating relation therewith, a piston member mounted within said tubular member and being comprised of a piston rod and a pair of piston elements mounted on said piston rod in axially spaced relation, said conduit means including a conduit connecting one end portion of said tubular member to a source of vacuum to draw said piston member in a direction towards said conduit when vacuum is applied to said conduit, resilient means urging said piston member in the opposite direction, said piston rod and piston elements being shiftable longitudinally of said tubular member between opposite extreme positions, one of said elements being positioned on said piston so as to be disposed at all times between the connection of said tubular member with said conduit and said discharge outlets and the other of said piston elements being disposed on said piston rod so as to be disposed between said fluid inlet and one of said discharge outlets when in one extreme position and so as to be disposed between said fluid inlet and the other of said discharge outlets when in the other of said extreme positions.

3. The structure defined in claim 1 wherein said vacuum-controlled flow-directing valve is comprised of an essentially closed tubular member having a pair of discharge outlets which are spaced axially and having a fluid inlet disposed therebetween in fluid-communicating relation therewith, a piston member mounted within said tubular member and movable longitudinally thereof between opposite extreme positions and being comprised of a piston rod and a plurality of piston elements mounted on said rod in axially spaced relation, said conduit means including a pair of conduits one each of which is connected in fluid-communicating relation with the interior of said tubular member at opposite ends thereof, and with the source of vacuum, one of said piston elements being positioned on said piston so as to be disposed between said inlet and one of said outlets when said piston is in one of said extreme positions and so as to be disposed between said inlet and the other of said outlets when said piston is in the other of said extreme positions, one of the other of said piston elements being located on said piston rod so as to be disposed at all times between one end of said tubular member and the most adjacent of said outlets and another of said piston elements being located on said piston rod so as to be disposed at all times between the other end of said tubular member and the most adjacent of said outlets.

4. A washing system for a milk line under vacuum having a milk receiver with an evacuating pump connected to the lower portions thereof and having a discharge normally discharging into a bulk milk tank, said system including:
   (a) a source of wash water;
   (b) means for connecting said source of wash water with one end of the milk line so that the wash water may be drawn therethrough by the vacuum into the receiver and discharged by the evacuating pump to wash the milk line;
   (c) a source of rinse water;
   (d) means for connecting said source of rinse water with one end of the milk line after the latter has been so washed so that the rinse water may be drawn therethrough by the vacuum into the receiver and discharged by the evacuating pump in order to rinse the milk line;
   (e) a hydraulically controlled valve structure connected to the discharge of the evacuating pump in receiving relation and having a pair of spaced discharge outlets one of which is directed to a drain and the other of which is directed to said source of wash water; and
   (f) programmed control means connecting said valve in programmed controlled relation to a source of vacuum and causing said valve to direct the wash water received by said valve from said pump discharge to said second-mentioned discharge outlet of said valve to thereby return the wash water to its said source and to direct the rinse water received by said valve from said pump discharge to said first-mentioned discharge outlet of said valve.

5. The structure defined in claim 4 wherein said valve structure is comprised of an essentially closed tubular member, the discharge outlets of which are spaced axially and having a fluid inlet disposed therebetween in fluid communicating relation therewith, a piston member mounted within said tubular member and being comprised of a piston rod and a pair of piston elements mounted on said piston rod in axially spaced relation, said control means including a conduit connecting one end portion of said tubular member to a source of vacuum to draw said piston member in a direction towards said conduit when vacuum is applied to said conduit, resilient means urging said piston member in the opposite direction, said piston rod and piston elements being shiftable longitudinally of said tubular member between opposite extreme positions, one of said elements being positioned on said piston so as to be disposed at all times between the connection of said tubular member with said conduit and said discharge outlets and the other of said piston elements being disposed on said piston rod so as to be disposed between said fluid inlet and one of said discharge outlets when in one extreme position and so as to be disposed between said fluid inlet and the other of said discharge outlets when in the other of said extreme positions.

6. The structure defined in claim 5 wherein said resilient means is disposed at the end of said tubular member connected to said conduit and one of said piston elements is disposed between said resilient means and said discharge outlet directed to said source of wash water and said other piston element is disposed between said inlet and said last-mentioned discharge outlet when said resilient means is in compressed condition and is disposed between said inlet and said outlet directed to the drain when said resilient means is in relaxed condition.

7. The structure defined in claim 4 wherein said valve structure is comprised of an essentially closed tubular member, the discharge outlets of which are spaced axially and having a fluid inlet disposed therebetween in fluid communicating relation therewith, and a piston member mounted within said tubular member and being shiftable longitudinally of said tubular member between opposite extreme positions, said control means including conduit means connecting a source of vacuum to said tubular member in piston-controlling relation, said piston member including a piston rod and a plurality of piston elements mounted on said piston rod in axially spaced relation, one of said piston elements being constructed and arranged on said piston rod so that it will be disposed between said inlet and one of said discharge outlets in one of said extreme positions and will be disposed between said inlet and the other of said discharge outlets in the other of said extreme positions.

8. The structure defined in claim 4 wherein said valve structure is comprised of an essentially closed tubular member, the discharge outlets of which are spaced axially and having a fluid inlet disposed therebetween in fluid communicating relation therewith, a piston member mounted within said tubular member and movable longitudinally thereof between opposite extreme positions and being comprised of a piston rod and a plurality of piston elements mounted on said rod in axially spaced relation, said control means including a pair of conduits, one each of which is connected in fluid communicating relation with the interior of said tubular member at opposite ends thereof, and with the source of vacuum, one of said piston elements being positioned on said piston so as to be disposed between said inlet and one of said outlets when said piston is in one of said extreme positions and so as to be disposed between said inlet and the other of said outlets when said piston is in the other of said extreme positions, one of the other of said piston elements being located on said piston rod so as to be disposed at all times between one end of said tubular member and the most adjacent of said outlets and another of said piston elements being located on said piston rod so as to be disposed at all times between the other end of said tubular member and the most adjacent of said outlets.

References Cited

UNITED STATES PATENTS

| | | | |
|---|---|---|---|
| 2,878,819 | 3/1959 | Thomas | 134—57 |
| 3,060,944 | 10/1962 | Brollo | 134—103 XR |
| 3,062,224 | 11/1962 | Skett et al. | 134—58 |
| 3,119,400 | 1/1964 | Bihler | 134—95 XR |
| 3,119,401 | 1/1964 | Merritt et al. | 134—57 |

ROBERT L. BLEUTGE, *Primary Examiner.*

U.S. Cl. X.R.

134—96, 103, 169